United States Patent

[11] 3,615,337

| [72] | Inventor | James B. Legg |
| | | Columbus, Ohio |
| [21] | Appl. No. | 856,560 |
| [22] | Filed | Sept. 10, 1969 |
| [45] | Patented | Oct. 26, 1971 |
| [73] | Assignee | The Eldred Company |
| | | Columbus, Ohio |

[54] SYSTEM MEANS FOR CONTROLLING THE FUEL SUPPLY TO BURNERS OF A GLASSWARE BURN-OFF MACHINE
5 Claims, 8 Drawing Figs.

[52] U.S. Cl. ................................................. 65/272,
65/113, 65/120, 65/283, 65/285
[51] Int. Cl. .................................................. C03b 23/00
[50] Field of Search .......................................... 65/113,
120, 272, 284, 285

[56] References Cited
UNITED STATES PATENTS

| 2,570,899 | 10/1951 | Wolf | 65/120 X |
| 2,629,205 | 2/1953 | Eldred | 65/272 X |
| 2,644,274 | 7/1953 | Bailey | 65/272 |
| 2,764,847 | 10/1956 | Buell | 65/113 |
| 3,188,189 | 6/1965 | De Leeuw | 65/120 X |
| 3,188,190 | 6/1965 | Armstrong | 65/120 X |

Primary Examiner—Frank W. Miga
Attorney—Mahoney, Miller & Stebens

ABSTRACT: A system for controlling the supply of fuel to the burners of a glassware burn-off machine which burns off the moils from hollow glass articles. It includes means for separately controlling the supply of combustible gas and oxygen to separate superimposed cavities of double-duty burners of such a machine in which the one cavity produces a melting flame for the moil connection and the other cavity produces a more intense flame for completely severing that connection.

INVENTOR.
JAMES B. LEGG

BY
MAHONEY, MILLER & RAMBO
BY
ATTORNEYS

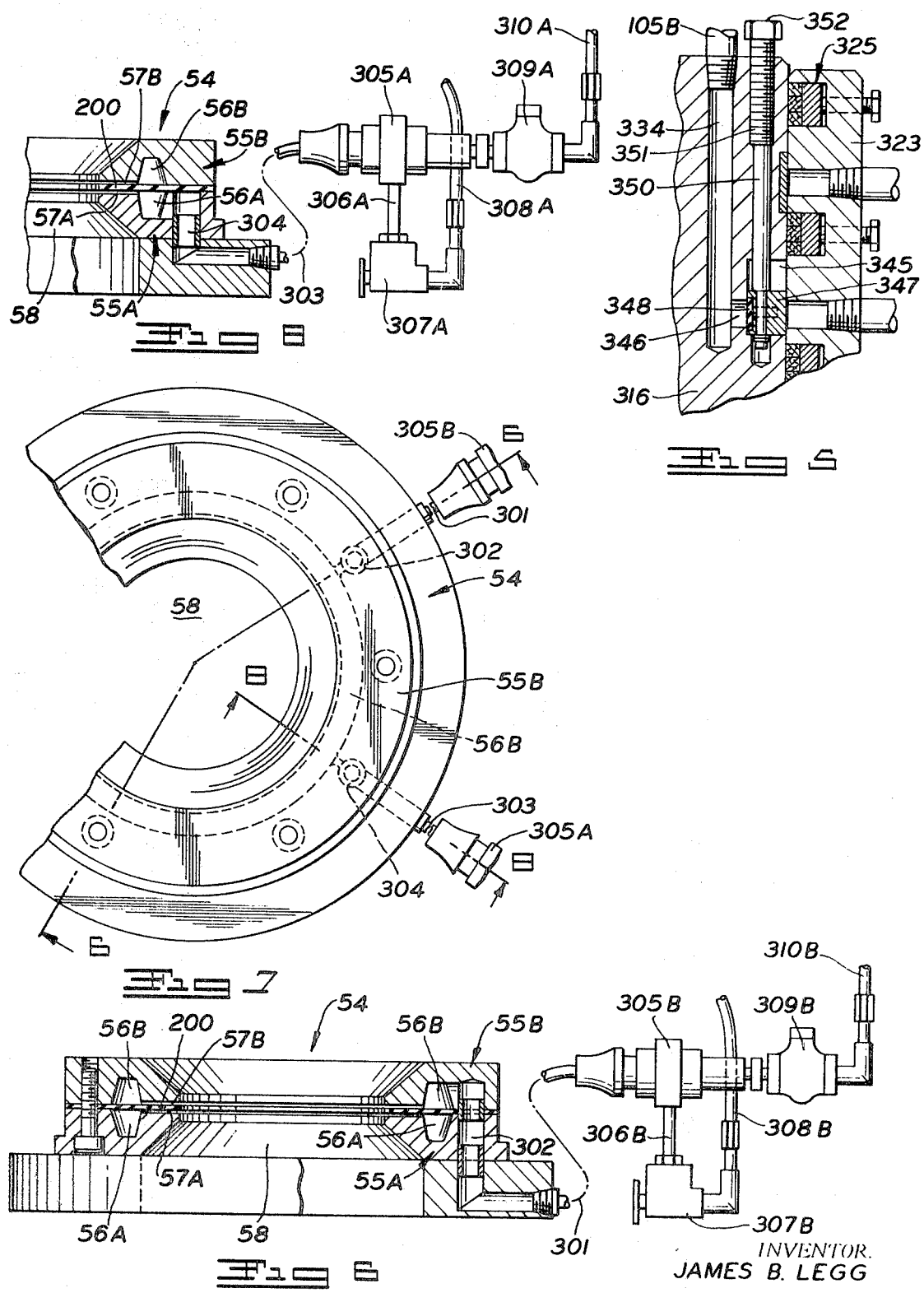

3,615,337

SYSTEM MEANS FOR CONTROLLING THE FUEL SUPPLY TO BURNERS OF A GLASSWARE BURN-OFF MACHINE

BACKGROUND OF THE INVENTION

This invention constitutes an improvement over the fuel supply system disclosed in the U.S. Pat. to Eldred, No. 2,629,205, issued Feb. 24, 1953.

The present invention provides a better and more flexible control of the gas and oxygen mixture for the respective superimposed burner cavities of the type disclosed in said patent. It comprises means for supplying selected gas and oxygen mixtures to the respective burner cavities during the stretching or melting operation and during the cutoff operation when a cutoff flame acts on the stretched moil for a selected period to produce complete severance. The system includes a fuel mixer for each burner cavity and also includes means whereby the amount of gas supplied to each mixer may be independently varied. The system also includes means whereby the amount of oxygen supplied to each mixer may be independently varied. In addition, means is provided in the system for accurately controlling the period during which the oxygen is supplied to both mixers and for selectively varying the period oxygen is supplied to the mixer which is connected to the cutoff burner cavity. Furthermore, the fluid distributor of the system is such that there will be no leakage of gas or oxygen under pressure. A preferred embodiment of my invention is illustrated in the accompanying drawings in which:

FIG. 5 is an enlarged vertical sectional view taken along line 5—5 of FIG. 3.

FIG. 6 is a vertical sectional view taken through one of the double burners at the position indicated at line 6—6 of FIG. 7.

FIG. 7 is a plan view of the burner.

FIG. 8 is a vertical sectional view taken at line 8—8 of FIG. 7.

Figure 1:
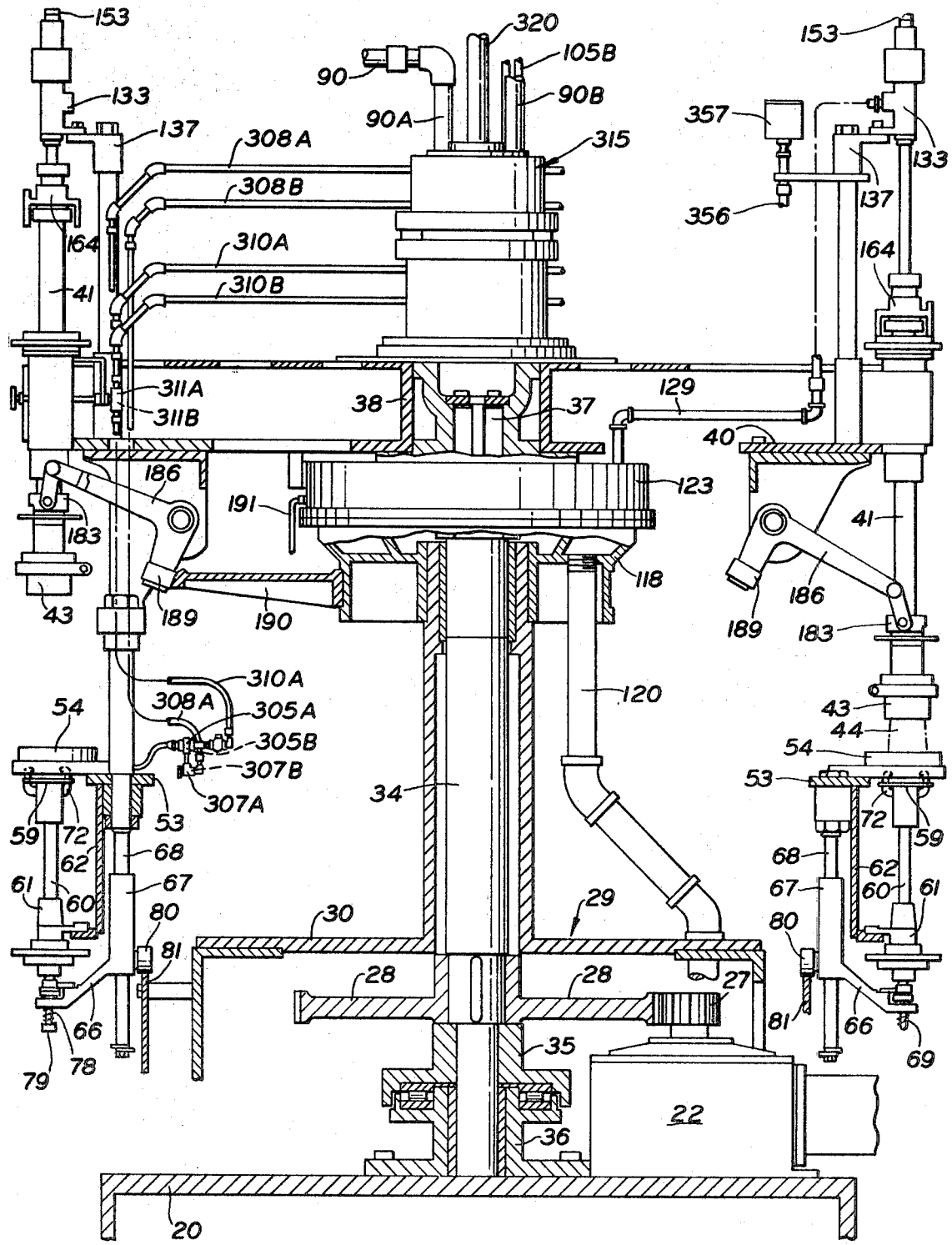
FIG. 1 is a schematic view in vertical section and side elevation illustrating the system of my invention applied to a glass burn-off machine.

Referring now to FIG. 1 of the drawings, there are shown generally parts of the burn-off machine of said patent with which the burners and fuel supply system provided in accordance with the present invention are associated. For purposes of facilitating cross-reference to said patent, common reference numerals are employed insofar as practicable. Attention is first directed to the rotatably mounted table or turret 40 and to a ring-member 53 which rotates in unison with the table 40. The machine is mounted on a base 20. Carried by the base is a gear-case 22, which carries a pinion 27 that drives a bull-gear 28. The gear 28 is keyed to an upstanding main operating shaft 34. Flanged collar 35, secured to shaft 34, is rotatably mounted on bearing 36. The housing 29 encloses the bull-gear 28. Positioned on top of and secured to cover 30 is an upstanding tubular bearing 31. The shaft 34 is rigidly secured at 37 to the hub 38 of the turret 40. The table 40 is thus driven to carry the ware through the operating zones disclosed in said patent and referred to hereinafter.

Attention is next directed to the means for holding and handling the individual pieces of ware, i.e., the chucks 43 (FIG. 1) and associated elements. At spaced intervals around the table 40 are rotatably mounted spindles 41. Each spindle carries a depending chuck 43, which is adapted to receive and retain by suction the closed end of a tumbler indicated at 44. Disposed below and in axial registry with each chuck 43 is an associated moil support 59.

As disclosed in said patent, rotation of the carriage 40 is continuous in a clockwise direction. Each piece of formed ware, including moil, is deposited bottom-up on an individual support 59 (FIG. 1) and prior to the instant when each individual support 59 accepts a tumbler, the moil support is in its fully elevated position, the corresponding rod 69 is fully elevated to open the grippers 72, 72 and the corresponding chuck 43 is in elevated position, whereby there is sufficient clearance between the chuck and its associated burner 54 and support 59 to permit insertion of the tumbler between them. The chuck is placed in this position as it leaves the unloading zone. However, after the table 40 rotates beyond the loading zone, the spindle is lowered to grasp the closed end of its tumbler and to impart axial rotation to the tumbler. Rod 69 is lowered to cause the fingers 72, 72 to grasp the moil before arrival at the melting and stretching zone.

As the table continues to rotate each tumbler successively passes through a heating zone segment, melting and stretching zone segment, a severing zone segment and a cooling zone segment, finally being discharged from the table 40. As the ware leaves the severing zone, the associated chuck 43 is elevated, the action being initiated by a cam 190. The burner 54 is supplied with oxygen and fuel to produce a flame in one temperature range for melting and softening the tumbler section, as the tumbler passes through the melting and stretching zones. This burner is supplied with oxygen and fuel to produce a sharper flame in a higher temperature range for final severing of the moil and tumbler as the tumbler passes through the severing zone. These two actions of the burner are controlled by governing its supply of oxygen in accordance with the present invention as later described. As the table 40 continues to rotate the ware finally registers with the unloading zone, the vacuum grip of the chuck 43 on the tumbler 44 is relaxed and the ware is removed from the table.

As indicated in said patent, each of the chucks 43 is associated with a burner 54 supported on the ring member 53 and having a control opening 58. Positioned concentrically with each opening 58 is the article support 59 mounted on the upper end of a vertical tube 60, secured in a sleeve 61, carried by a bracket 62, the latter being secured to a sleeve 67, vertically slidably mounted on a rod 68 depending from ring 53. Slidably mounted in each tube 60 is a rod 69, the upper end of which is operatively connected to the moil-grippers 72.

As disclosed in said patent, when each tumbler 44 is deposited on its support 59, the grippers 72 are relaxed and the support 59 is in its elevated position. As the tumbler departs from the melting zone, its physical state is such that it can be deformed. The grippers 72 are then actuated to engage and stretch the moil. The engaging function is prompted by downward movement of the rod 69, relative to the tube 60, under the influence of a compression spring 78. The relaxation of the grippers 72, on the other hand, is effected by a cam 79 which elevates rod 69 in preparation for reception of a tumbler 44 on the support 59. A low surface of the cam 79 permits the rod 69 to be depressed before the ware reaches the stretching zone.

An arm 66 carries the sleeve 67 in which the rod 68 is mounted for vertical movement. Secured to the arm 66 is a roller 80, which follows a cam 81 on the base of the machine (FIG. 1) to elevated bracket 66 and consequently support 59 for the acceptance of tumbler 44 on the support, and to lower the support during the melting and stretching operation. Stretching of the ware occurs during the turning of table 40, the glassware being gripped by grippers 72 during the stretching operation, and stretched by the gravitational pull of elements 59, and associated elements, the cam surface of cam 81 then being low. After initial gripping of the moil, the support 59 is rotated by the drag of ware 44 on it, it being understood that spindle 41 is then in rotation. However, as the moil approaches severance, the pliability of the glass becomes so great that rotation of support 59 relative to its own central axis ceases.

Reference has been made to a plurality of spindles 41, each carrying a chuck 43. For the purpose of elevating the chuck 43 which is normally gravitationally biased downwardly, there is provided a collar 183 so arranged that when the collar 183 is elevated, spindle 41 and chuck 43 are also elevated. As disclosed in said patent, collar 183, when elevated, also causes cessation of rotation of chuck 43, but when depressed causes axial rotation of chuck 43. The elevation and depression of collar 183 is controlled by a bellcrank lever 186. The other arm of lever 186 carries a cam roller 189, adapted to follow a cam plate 190 and elevate chuck 43 preparatory to reception of the tumbler 44. The shape of cam 190 is such that chuck 43 is depressed to grasp the ware after its deposit on the support 59. The chuck is of course elevated to release the ware after moil severance and cooling.

As disclosed in said patent, vacuum is applied to each chuck 43 successively to control the grasp of tumblers 44 during the heating, stretching, severing and cooling operations, and pressure is applied thereto to release the ware preparatory to the unloading operation. The suction and pressure are properly timed and controlled by means including the following elements: housing 118, main vacuum line 120, connector 123, pressure line 191, chuck service pipe 129, and pipe 120, the connector 123 having provisions for establishing communication between the pipe 129 and the pipe 120, or the pipe 191 at properly timed intervals, pneumatic housing 133 supported on the upper end of the post 137 carried by the table 40, a valve regulated by adjusting screw 153, and a valve actuating cam arrangement (not shown). The valve is actuated at suitable times to control the creation of suction or pressure, as desired, within the chuck 43.

Associated with each spindle 41 is a clutch 164 which is engaged and disengaged as indicated in said patent to rotate the spindle or interrupt its rotation.

A primary purpose of the above summary description of pertinent portions of a burn-off machine for which my fuel supply system for the burner is ideally suited, is to make clear how each item of ware is received, grasped by the associated chuck as the chuck is depressed, the chuck being axially rotated but vertically fixed in registry with the associated burner, melted and clamped at the moil as it is stretched, severed from the moil, cooled, and finally released by the chuck after which it is unloaded. The presentation of each tumbler to, and its motion when in the presence of the burner being fully understood, the following description is confined to the burner and its fuel supply system.

In accordance with the present invention, the fuel supply system is designed to supply fuel to a burner 54 of the general type shown in said patent and also shown in detail in FIGS. 6 to 8 of the accompanying drawings. A plurality of these burners are carried by the ring 53, an individual burner being axially aligned with each spindle 41. The open end of each article of received ware is inserted into a central opening 58 in a burner 54, of generally annular shape. The burner provides one ringlike flame for melting, softening and fire finishing the ware. This melting flame is preferably furnished by the lower burner member 55A. The burner provides a second ringlike flame for finally severing the moil from the ware. The severing flame is of a higher temperature and sharpness than the first. Suitable illustrative orders of temperature may be 3000° F. for the first flame and 3500° to 4000° F. for the second.

Each burner, as disclosed in FIGS. 6, 7, and 8 comprises a cap member 55B and a base member 55A separated by an annular shim 200. The cap and base members are of generally annular shape and cooperate with the shim to form internal circulating cavities 56A and 56B. The interior cavities 56A and 56B communicate with discharge burner slits or orifices 57A and 57B. As previously indicated, the lower burner slit 57A will provide the flame for the melting and stretching of the moil connection and the upper burner slit 57B will provide a more intense flame for the complete severing of the moil connection.

A proper fuel mixture is supplied to the upper burner cavity 56B, as shown in FIG. 6, by means of a line 301 leading radially into the burner 54 and connected by a passage 302 to the upper cavity. A proper fuel mixture is supplied to the lower burner cavity 56A, as shown in FIG. 8, by means of a line 303 leading radially into the burner and connected by a passage 304 to the lower cavity. The line 303, for supplying the lower cavity 56A, receives a predetermined fuel gas and oxygen mixture from a mixer 305A whereas the line 301, for supplying the upper cavity 56B, receives a different fuel mixture from another similar mixer 305B, as shown best in FIG. 6.

A fuel supply line 310A leads through a check valve 309A to the mixer 305A, the check valve serving to prevent backfire. Oxygen is supplied to the mixer 305A by means of a line 308A which connects to a valve 307A that is connected by the line 306A to the mixer 305A. Similarly, gas supply line 310B leads through check valve 309B to the mixer 305B, and oxygen supply line 308B connects to the valve 307B which, in turn, connects by line 306B to the mixer 305B. Valves 307A and 307B are of the manually adjustable type to independently control the amount of oxygen reaching the respective mixers 305A and 305B.

The oxygen lines 308A and 308B are connected directly to the fuel distributor unit 315 of the present invention which is located at the top of the machine. The gas lines 310A and 310B are also connected to the distributor 315, but are provided with the manual control or regulator valves 311A and 311B, respectively, (FIG. 1) which control the amount of gas reaching the respective mixers 305A and 305B. Thus, the amount of gas supplied to the respective mixers can be independently selected by the setting of the valves 311A and 311B and the amount of oxygen supplied to the respective mixers can be independently selected by the setting of the valves 307A and 307B. As shown best in FIG. 2, the stretch oxygen line 308A, the cutoff oxygen line 308B, the stretch gas line 310A and the cutoff gas line 310B are connected to the distributor 315 at successively lower levels starting at the top.

The improvement of the present invention over that disclosed in U.S. Patent No. 2,629,205, consists in the distributor 315 and its various connections to the mixers 305A and 305B which supply the proper mixtures of gas and oxygen to the respective stretch burner cavities 56A and cutoff burner cavities 56B of the burners 54.

The distributor 315 is a cylindrical unit disposed above the table coaxial therewith as indicated in FIG. 1 and the details of this unit are shown in FIGS. 2 to 5, inclusive. It includes the vertically disposed tubular distributor core 316 which is provided with a central opening that rotatably receives a stubshaft 317 which is coaxial with the main vertical shaft 34 of the burn-off machine. This shaft has an integral flange 318 on its lower end which is bolted by bolts 318' to the table 40 so that it will rotate therewith. The core 316 is held against rotation with the shaft 317 by an upstanding post 320 which is fixed at its upper end to a suitable fixed support (not shown) and which has an integral flange 319 on its lower end that is fixed to the upper end of the core 316 by the bolts 319'. Between the lower end of the core 316 and the flange 318 in antifriction bearing 321 is provided. The distributor 315 also includes a lower gas-distributing manifold drum 322 and an upper oxygen distributing manifold drum 323, both of which surround the core 316 and are rotatable around the core. The drums are connected to the table 40 for rotation therewith by bolts 322' pass upwardly through the flange 318 into the lower edge of the drum 322 and bolt and spacer unit 324 which connect the upper edge of the drum 322 to the lower edge of the drum 323. To ensure a fluidtight seal between the core 316 and the drums 322 and 323, a number of adjustable sealing gasket units 325 are provided at various levels. Each unit comprises an annular deformable gasket 326 and a split metal ring 327 located in an annular normally open slot 328 formed in the interior surface of the drums. Each gasket is compressed, to the extend desired, into tight engagement with the exterior of the core 316 by means of adjusting bolts 330 threaded through the drum wall into engagement with the ring 325 at angularly spaced positions around the drum.

A line 90 (FIG. 1) supplies gas to the machine at its upper end. This line 90 is connected to two branches, 90A and 90B (FIG. 2) which lead into the upper end of the core 316 of the distributor 315. The line 90A is an inlet line for the gas to be supplied during the moil melting and stretching operation whereas the line 90B is an inlet line for the gas to be supplied during the moil cutoff operation. Oxygen from a suitable source is supplied to the core 316 of the distributor 315 by means of a single pipe 105A (FIG. 2) adjacent the gas pipe 90A and a group of pipes on of which is shown at 105B in FIG. 5 which are spaced angularly in the clockwise direction of rotation of the drums 322 and 323 about the core 316. The pipe 105A is adapted to supply oxygen for the melting and stretching operation and the pipes 105B are adapted to supply oxygen during the cutoff operation, as will be clear later. Various numbers of pipes 105B may be provided for the oxygen cutoff supply.

Figure 3:
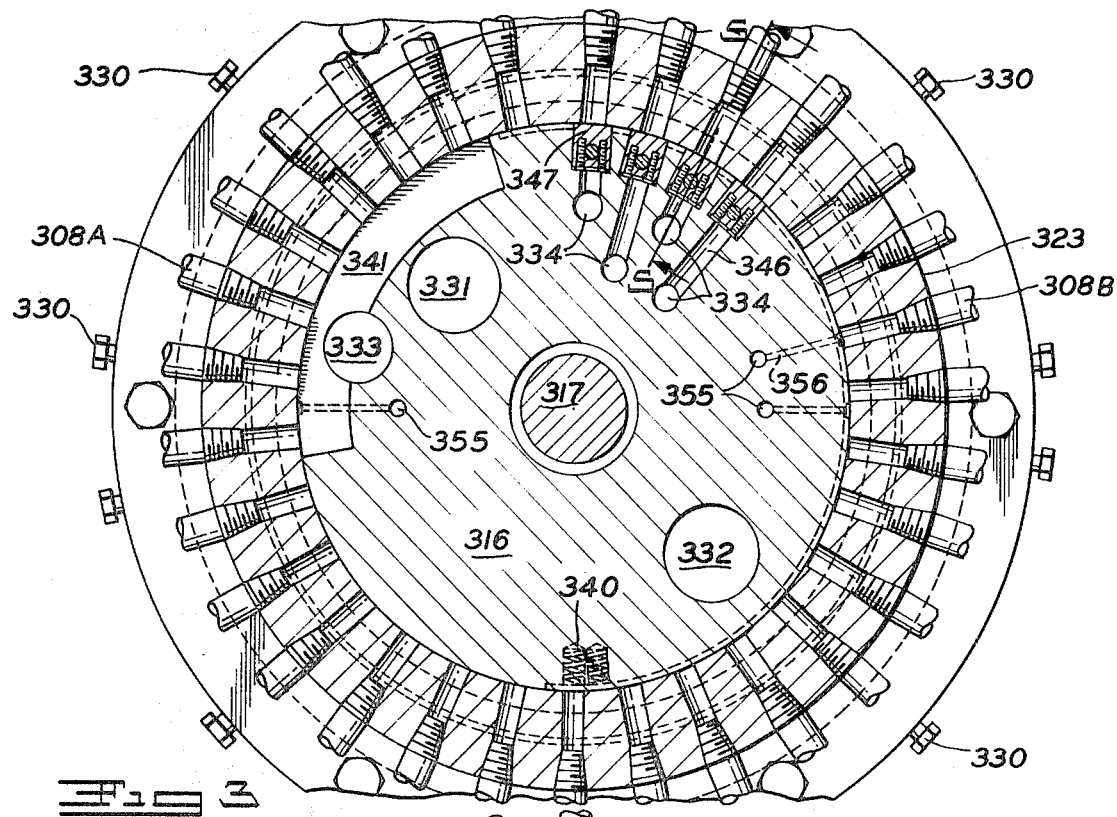
FIG. 3 is a longitudinal sectional view taken along line 3—3 of FIG. 2.
Figure 4:
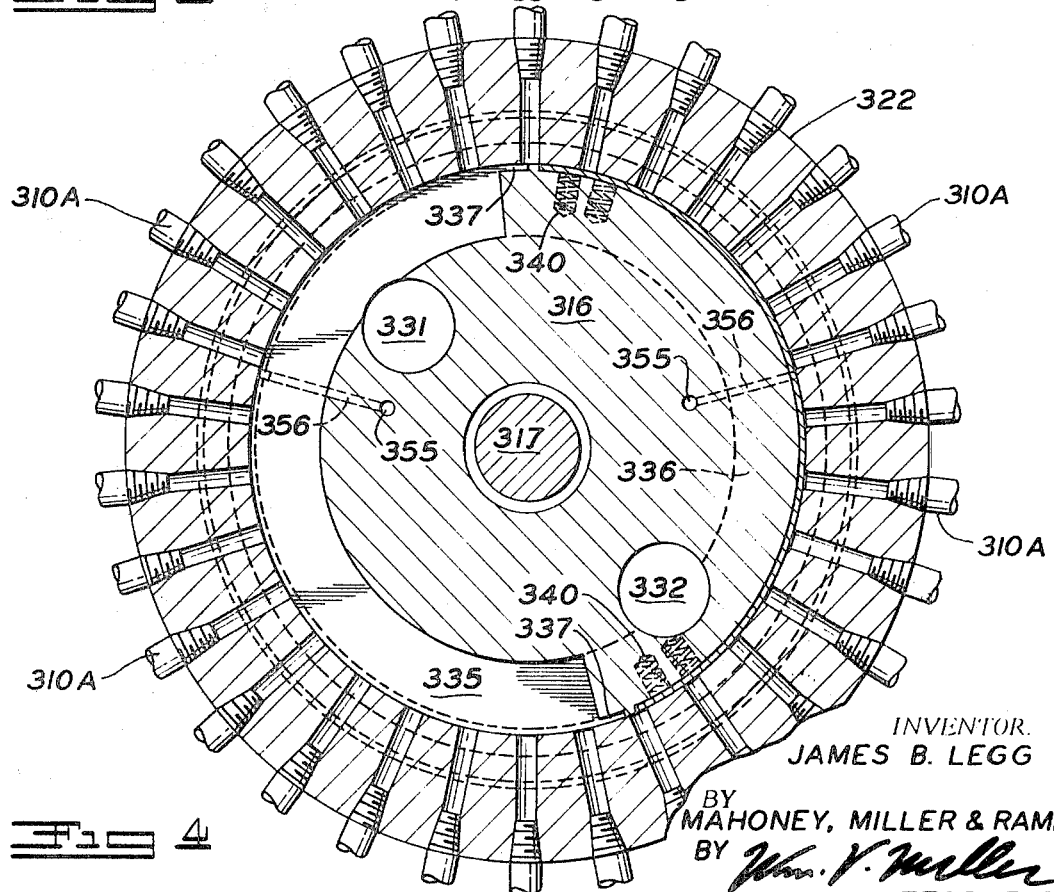
FIG. 4 is a horizontal sectional view taken along line 4—4 of FIG. 2.

The gas pipe 90A communicates with the upper end of a vertical passage 331 formed in the core 316. The gas pipe 90B communicates with the upper end of a vertical passage 332 formed in the core 316 at a point diametrically opposed to the passage 331. The oxygen pipe 105A communicates with a vertical passage 333 in the core adjacent the gas passage 331 and each of the oxygen pipes 105B communicates with a vertical passage 334 (FIG. 5) formed in the upper end of the core. Four of these passages 334 are shown in FIG. 3 but as indicated, any desired number may be provided in angularly spaced positions.

The lower end of the inlet passage 331 for gas for the melting and stretching operation is connected to an outwardly opening arcuate chamber 335 in the periphery of the core 316 and similarly the inlet passage 332 for gas for the cutoff operation is connected at its lower end to an outwardly opening arcuate chamber 336 in the periphery of the core 316. The chambers 335 and 336 are spaced vertically but are so disposed angularly in the core 316 that together they provide an arcuate chamber extending completely around the core so that gas will always be supplied to the burners 54. This will be evident from FIG. 4 where the stretch gas chamber 335 is shown in full lines and the cutoff gas chamber 336 is shown in broken lines. It will further be noted that the chamber 335 is provided with a reduced extension 337 at each end overlapping the adjacent end of the chamber 336 to ensure overlap of the gas supplied by the two chambers. It will be noted that each of the chambers 335 and 336 is located vertically between a pair of the gasket units 325 for effective sealing. It will also be noted that between the ends of the chamber 335 is an arcuate shutoff strip 338 and between the ends of the chamber 336 is an arcuate shutoff strip 338'. Each strip 338 or 338' is inserted in an outwardly opening peripheral groove 339 provided in the periphery of the core 316 and is urged outwardly into sealing contact with the inner surface of the associated drum 322 or 323 by means of the compression spring 340.

The lower end of the passage 333 for oxygen for the stretch operation is connected to an outwardly opening arcuate chamber 341 formed in the periphery of the core 316. Extending between the ends of this chamber is an arcuate shutoff strip 342 which is mounted and urged outwardly in the same manner as the shutoff strips 338 and 338'.

The lower ends of the four passages 334 for oxygen for the cutoff operation are all connected to outwardly opening chambers 345 (FIG. 5) formed in the periphery of the core 316 at angularly spaced intervals. Extending around the remainder of the periphery of the core is shutoff strip 343 like the strips 338, 338' and 342 previously mentioned.

Unlike the arcuate gas chambers 335 and 336 which overlap to provide a continuous supply of gas to the burners 54, the stretch oxygen-supplying chamber 341 and the group of cutoff oxygen-supplying chambers 345 do not overlap, but supply oxygen at different times during the rotation of the drums 322 and 323.

Like the gas chambers, the group of oxygen chambers 345 is also vertically spaced from the oxygen chamber 341. Chamber 341 is located vertically between a pair of the gasket units 325 and the group of chambers 345 is similarly located for sealing purposes. It will be noted that the oxygen chamber 341 is superimposed relative to the gas chamber 335 but is not of as great angular extent as the gas chamber and its ends are spaced angularly within the ends of the gas chamber. Furthermore, it will be noted that the oxygen-supplying chamber 345 are disposed angularly beyond the gas chamber 335 in a clockwise direction and over the gas chamber 336 for a preselected angular extent thereof.

As indicated in FIG. 5, each of the vertical oxygen cutoff passages 345 has a metering valve associated therewith for controlling or stopping the flow of oxygen from the vertical passage 334 through a horizontal bore 346 into the associated chamber 345. This valve includes a vertically movable valve member 347, mounted for movement over the outer end of the bore 246 and including a sealing gasket 348 at its inner side. This valve member is disposed in the chamber 345 which is of greater vertical extent. The valve member is carried on the lower end of a stem 350 which is threaded into the upper end of a vertical bore 351 that connects with the chamber 345. The upper end of the stem 350 carries a nut 352 which is exposed at the upper end of the core so that the stem can be threaded into and out of the core to move the valve member 347 vertically to vary the extent of coverage of the bore 346 and thereby meter the flow of oxygen into the chamber 345. The valve members 347 may be completely closed successively to completely interrupt flow into and from certain successive chambers 345 and in effect provide an arcuate chamber of selected length similar to the other arcuate supply chambers. If desired, the same arrangement could be provided for metering oxygen at the chamber 341.

Means may be provided for supplying lubricant between the core 316 and the drums 322 and 323 rotatable thereon. This means is shown as comprising a plurality of vertically disposed bores 355 in the core which have passages 356 leading radially therefrom and out through the various shutoff strips 338, 338', 342, and 343. The cores 355 extend to the top of the core where they are connected (not shown) to a supply line 356 which, as shown in FIG. 1, leads from a lubricant-supplying cup 357 supported at the top of the machine.

Figure 2:
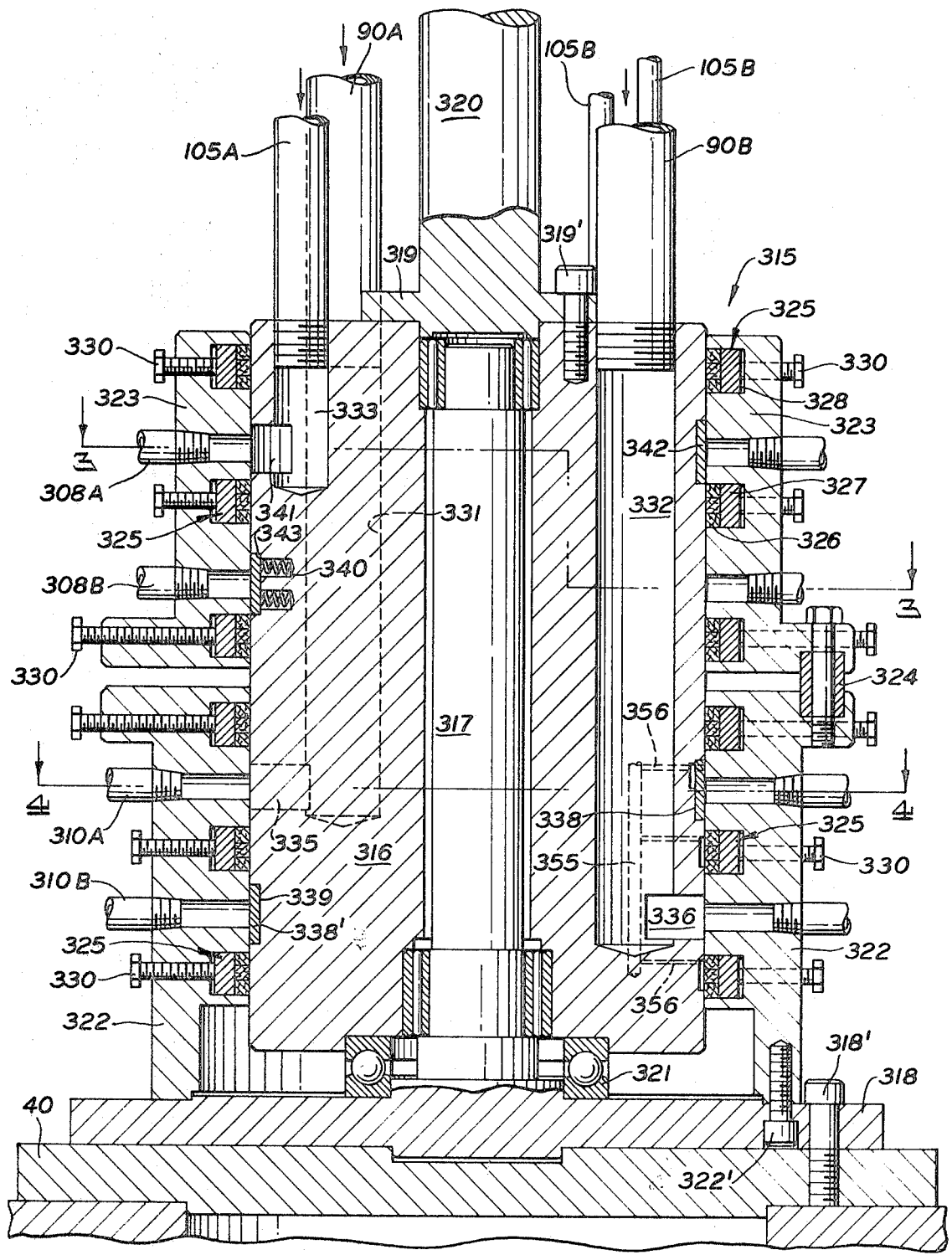
FIG. 2 is an enlarged axial or vertical sectional view through the fuel distributor of the system.

The various oxygen and gas-supplying lines lead from the distributor 315 as previously indicated and are at various levels as shown in FIGS. 1 and 2. Thus, the stretch oxygen lines 308A lead from the upper or oxygen-supplying drum 323, a line 308A being connected to mixers 305A for the respective burners 54. The connections of the lines 308A to the drum 323 are, as indicated at FIG. 2, at a level corresponding to that of the arcuate chamber 341 in the core 316 and it will be noted from FIG. 3 that these connections are at angularly spaced intervals around the drum. The cutoff oxygen lines 308B are similarly connected to the drum 323 at a level corresponding to that of the chambers 345 and it will be understood that these lines correspond in numbers to the burners and are connected to mixers 305B for the respective burners 54. The stretch gas lines 310A correspond in numbers to the burners 54 and are connected to the gas drum 322 in angularly spaced position at a level corresponding to the gas stretch chamber 335. Similarly, the cutoff gas lines 310B, corresponding in number to the burners, are connected to the drum 322 at angularly spaced positions and at a level corresponding to the arcuate gas cutoff supplying chamber 336.

It will be apparent that when the machine is operating and the main table 40 is rotating, the distributor drums 322 and 323 will rotate therewith about the core 316. During this rotation of the table, as previously indicated, the burners 54 and chucks 43 are in cooperation and the articles supported by the chucks are moved into and out of the burners and while within the burners are subjected to the stretching and severing operations. Gas will be supplied continuously to both cavities 56A and 56B of the burners 54 during both operations, that is during the melting and stretching operation and the cutoff or severing operation, and there is an overlap of this supply so there will be flame at at either one or the other cavities to eliminate the need of a pilot burner. During rotation of the table, oxygen for the melting and stretching operation will be supplied by the arcuate chamber 341 for a predetermined period while the gas for such operation will be supplied by the chamber 335, but for a longer predetermined period. Continued rotation of the table will cause oxygen to be supplied for the cutoff operation by the various valve chambers 345 as they align successively with the lines 308. However, any one of the valves 347 can be adjusted to interrupt or vary flow of oxygen through any of the chambers 345 thereby varying the amount of oxygen supplied to the upper or cutoff cavity 56B and the period during which it is supplied. Thus, gas is continuously supplied to both burner cavities, and the amount can be varied by the setting of valves 311A and 311B but oxygen is supplied to the different cavities at different intervals during the rotation of the table. The amount of oxygen supplied to each mixer 305A and 305B can be selected by setting of the valves 307A and 307B. This will result in the provision of a suitable melting flame during the stretching operation and a suitable cutoff flame during the severing operation, which operations will occur at preselected angular positions around the machine during rotation of the table 40.

Having thus described my invention, what I claim is:

1. In a rotary burn-off machine of the rotatable turret type having means for supporting glassware and burner units in cooperative relationship during the burning-off operation which occurs at a predetermined angular position of the turret and in which each of the burner units includes at least a pair of cavities adapted to be supplied with different oxygen and gas fuel mixtures by mixers connected to the respective cavities so as to produce different types of flames suitable for successively melting and then severing the glass of the ware, the improvement which comprises:

a distributor for distributing oxygen and gas to the respective mixers:

said distributor comprising a rotatable drum rotatable with the turret having sets of gas conduits connected thereto and communicating with the interior thereof at angularly spaced intervals and connected to the respective mixers for the cavities of the burner units;

a core surrounded by the drum and around which it revolves;

said core having arcuate shaped gas-supply chambers opening outwardly at different angular positions and adapted to be brought into communication with the respective sets of gas conduits by rotation of the drum;

said core also having arcuate shaped oxygen-supply chambers opening outwardly thereof at different angular positions with inlets leading thereinto and the chambers adapted to be brought into communication with the respective sets of oxygen conduits by rotation of the drum; and manually adjustable valves for controlling inlets of certain of said oxygen chambers for preventing communication thereof with the successive angularly disposed cooperating oxygen conduits of said drum to vary the time during rotation of said drum when oxygen is supplied to at least one of said mixers.

2. The combination of claim 1 in which said inlets lead radially outwardly into said chambers, said valves comprising valve members in said chambers, and manually adjusting means connected respectively to said valve members and extending to a point externally of said core for selectively moving said members over the oxygen inlets of the oxygen chambers.

3. The combination of claim 1 in which said drum and core are disposed with their axes vertical, said gas chambers in the core being located at one level and said oxygen chambers in the core being located at different levels, the respective gas and oxygen conduits being located at corresponding levels, and sealing gasket units between the core and the drum at vertically spaced positions to axially seal the respective chambers.

4. The combination of claim 3 in which the arcuate gas chambers for the respective sets of gas conduits angularly overlap to provide a continuous supply of gas, the arcuate oxygen chambers extending only a portion of the circumference of the core with arcuate spaces therebetween, and arcuate sealing strips disposed in said spaces at the same level as the oxygen chambers, and yieldable means pressing the strips radially outwardly into contact with the drum.

5. The combination of claim 4 including lubricating passages leading through the core to each of said gasket units and said sealing strips.